3,082,228
METHOD FOR PRODUCING MONOESTERS OF POLYUNSATURATED FATTY ACIDS
Leslie H. Sutherland, Wilton, Conn., assignor to Escambia Chemical Corporation, Wilton, Conn., a corporation of Delaware
No Drawing. Original application Dec. 18, 1959, Ser. No. 860,352. Divided and this application Nov. 4, 1960, Ser. No. 67,173
6 Claims. (Cl. 260—420)

The present invention relates to an improved process of producing polyunsaturated higher fatty acids. It is a division of my copending application Serial No. 860,352 filed December 18, 1959.

A serious medical problem is presented by a type of arteriosclerosis called atherosclerosis. This disease results from deposits of cholesterol and fat on the inner lining of the blood vessels, thus constricting blood flow. In general two parts of the human body are particularly vulnerable, the coronary and other arteries of the heart and the arteries of the brain. In the first case the result of atherosclerosis results in various heart disturbances of varying severity, such as the common pain referred to as angina pectoris which results from restricted blood flow and which in itself is not immediately fatal although very painful and a warning of possible more serious attacks. When a portion of the cholesterol-fat deposit breaks off from the wall of the blood vessel it forms a clot, or thrombos, and can result in coronary thrombosis which results in death or serious heart impairment, or in the case of the cerebral arteries a clot frequently causes the blood vessel to burst and produce hemorrhages which are usually referred to as "strokes." Manifestations of atherosclerosis are extremely serious, fatal coronary thrombosis being the largest single cause of death in the United States.

Diet and nutrition are generally considered to be an important factor, though not the only one, in atherosclerosis. Many statistical studies have shown that large groups of people throughout the world who live on low fat diets or diets in which fats are predominantly unsaturated, as for example, diets in which the fats are for the most part vegetable oils, have low incidence of atherosclerosis. On the other hand, other large groups having a high fat diet and particularly a diet that is high in saturated fats show much higher incidences of atherosclerosis. Cholesterol intake in the diet appears to be much less serious as the human body is capable of utilizing cholesterol so that increased cholesterol ingestion does not normally result in a corresponding increase of blood cholesterol content. However, with many people, the fats in the diet do have a very significant effect on the concentration of cholesterol in the blood, which in turn shows a high correlation, though not an absolute one, with incidence of atherosclerosis.

It has been determined that the saturated fats which are the ones that create a problem are not all equally dangerous. The lower molecular-weight fats, glycerides of lower molecular-weight saturated fatty acids, are much more harmful than the higher ones. For example, the 18-carbon acid fats, such as tristearin, are less dangerous than fats of a lower number of carbon atoms, for instance, those derived from coconut palms and to some extent present in butter.

It has been proposed to lower blood cholesterol in humans by the administration of certain vegetable oils, such as corn oil or safflower oil, which contain high proportions, normally about 50 percent, of glycerides of linoleic acid, having two double bonds. This therapy has in fact been of considerable effectiveness. However, it has been more restricted in its use due to the fact that the linoleic esters can counteract the effects of only a limited amount of saturated fats, and so seriously restricted diets have been necessary when corn oil is used. Also the reliability of protection from atherosclerosis or from excessive blood cholesterol content is not nearly as great as would be desired.

According to the present invention, it has been found that if a product containing at least 60 percent of polyunsaturated fatty acids having 20 or more carbon atoms in their natural configuration is used, the effectiveness as far as blood cholesterol content is concerned is enormously increased. For example, as has been recently published in the American Journal of Medical Sciences, June 1959 by Worne and Smith, esters of arachidonic acid are enormously more effective than the corresponding esters of linoleic acid, a much greater cholesterol-lowering being obtained with a quarter of the dose. Even those products of the present invention having the lowest content of polyunsaturated higher fatty acids are normally of the order of six times as effective as corresponding esters of linoleic acid, and some of the preferred products which have still higher concentrations of the unsaturated acids are even more strikingly effective.

It should be noted that the effect is primarily of the unsaturation in the acid and it is relatively unimportant in what form the acid is present so long as it is physiologically acceptable. In general, esters of the fatty acids which are well tolerated by the body are preferable. The free acids themselves are not so well tolerated and, therefore, less desirable. Theoretically it would be entirely suitable to use glycerides, for example, fish oils such as menhaden, cod liver, shark liver and other oils. However, for a very practical reason these products cannot be used because the taste and odor is so offensive that patients will not accept them. Also, it is not readily possible to increase the concentration of the desired fatty acid compounds in these glyceride oils. As will be shown below, I have developed a very simple and effective process for concentrating and deodorizing products which are monohydric esters of the polyunsaturated fatty acids of more than 20 carbon atoms. For simplicity and convenience, the lower alkyl esters such as methly and ethyl esters are desirable. Other mono esters, however, may be used such as, for example, monoglycerides. The nature of the alcohol appears to exert no physiological effect so long as it does not introduce undesirable characteristics of its own into the product. Because of their convenience methyl and ethyl esters constitute the preferred embodiments of the present invention.

Another factor should not be lost sight of, and this is the nature of the concentrated fatty acid products. Polyunsaturated fatty acids and their esters, particularly those of high molecular weight, are extremely sensitive to isomerization and unfortunately the beneficial physiological effects in lowering blood cholesteriol appear to be intimately tied up with the position of the double bonds in the acids and, possibly to a lesser degree, in their geometrical isomerism. The physiologically useful products in nature are unconjugated insofar as their double bonds are concerned. Conjugation appears to remove almost completely their beneficial effects. Also, the beneficial natural products are all in the cis configuration. Isomerization to the trans form is to be avoided. The necessity of preventing these types of isomerization imposes a severe limitation on the purification and concentration procedures to be used. Therefore, it should be clearly borne in mind that the products of the present invention, which have at least 60 percent of polyunsaturated fatty acids having 20 carbon atoms or more, must contain these acid compounds predominantly in their natural configuration.

Quantitative experimentation in blood cholesterol control is very difficult with human subjects because of the capability of the human body to eliminate excess cholesterol in the diet to a very large degree. It is thus not readily possible to produce quantitatively reliable cholesterol levels in human beings and, of course, the dangers of experimentation preclude unreasonable diets. Therefore, just as in the former case of the esters of linoleic acid such as corn oil, testing of the products of the present invention in humans is primarily a statistical problem. It is reliable, but quantitative results cannot be readily obtained.

A number of test animals, however, do not have the capability of the human body of getting rid of excess cholesterol and thus it is possible to produce any reasonable degree of artificially induced cholesterolemia in these test animals. Among the test animals that are most useful are rats, chicks and dogs. When fed diets with excessive cholesterol any desired blood cholesterol content can be obtained. For purposes of this specification rats have been chosen as the test animal, because results with these animals correlate well with the statistical studies on human beings. Normal rats have 60–80 mg. cholesterol per 100 ml. of blood (milligram percent). When these rats are fed a high cholesterol diet and provided with 10% of their caloric intake as lard or other saturated fat, their cholesterol blood-level equilibrates at 400–500 milligram percent in about two weeks. The anticholesterol treatment presently used by the medical profession is corn oil or safflower oil. When rats are fed the high cholesterol diet and provided with 10% of their caloric intake as corn oil, their cholesterol blood level equilibrates in two weeks at 200–300 milligram percent. When rats were fed the high cholesterol diet and provided with 10% of their caloric intake in the form of methyl esters of menhaden oil fatty acids having an iodine value of 328 (Table 1 of Example 1 hereinbelow), their cholesterol blood level after two weeks of feeding had reached only 89–100 milligram percent.

It is an advantage of the present invention that products can be produced simply and cheaply from various sources such as fish oils and these products are not only of high potency but also have but little remaining odor. Particularly with the preferred products of the present invention, which have a very high content of the higher unsaturated fatty acids, the dose can be kept fairly low and in general in no case needs to be more than ⅓ ounce per day. Administration can be of a liquid, or the liquid may be incorporated in gelatin capsules. This relatively small dose should be compared with three ounces a day which is a standard dosage when corn oil is used. The products of the present invention are mixtures, but this is of no significance. All of the natural polyunsaturated fatty acids, of 20 or more carbon atoms, are practically equally effective. It is, therefore, not necessary to isolate the ester from any particular acid in pure form which would be prohibitively expensive compared to the cost of the mixtures of the present invention. Another advantage of the present invention is that in the doses required for humans as set out above the products of the present invention have not shown symptoms of mouth or lip irritation when taken by human patients.

The improved process of preparing the products of the present invention, which itself is an important aspect of the invention, consists essentially of a molecular distillation of mono esters of higher fatty acids, or alternately, a complexing selectively with urea. Although molecular stills are known items and can be bought on the market, which is an advantage of the present invention, it should be carefully borne in mind that molecular distillation bears little resemblance to ordinary distillation. Since these distinctions very vitally affect the character of the product, they merit careful discussion.

Ordinary distillation, whether under a vacuum or not, involves bringing the material to a temperature at which the partial pressure of the constituents to be distilled equals the pressure maintained in the still and the residence in the still must be sufficiently long so that this evaporation takes place. Unfortunately, this is just what is undesirable, because heating promotes isomerization and other undesired reactions and is something to be avoided at all costs.

A molecular still operates under a different principle. When a liquid is passed between two surfaces, one of which is much colder than the other, and the pressure is maintained very low, molecules of the material will leave the film from a hot surface and will condense on the cold surface. This phenomenon takes place at a temperature below that at which all of the desired material will vaporize in an ordinary still. The phenomenon is statistical in nature as the molecules on the warm film will on the average have higher velocity than those on the cold film and more molecules will, therefore, move from the warm film to the cold film than in the reverse direction. It is thus possible in the molecular stills to obtain a separation at a lower temperature than could be used practically in an ordinary still. Also, it is not necessary to effect distillation all in one pass. The material to be concentrated can be passed through the molecular still repeatedly effecting further concentration. By this means it is possible to effect a separation of the desired esters from fatty acid esters of lower molecular weight, esters of saturated fatty acids and many of the constituents of the undesirable odor in fish oils.

It is not very practical to deal with the triglycerides themselves as their vapor pressure is too low, and their acid components are not uniform in any one molecule. Therefore, it is first desirable to produce the monoglycerides or esters of lower alkanols by processes of interesterification or transesterification. This step, although a necessary one for the best operation of the process of the present invention, is not in itself new, and when used in the process of the present invention, no departure is made from customary procedure except that care is taken to keep temperatures low and the esterification treatment as gentle as possible.

While the molecular stills are of ordinary design and are not operated by any new technique, it is desirable to keep the distillation of the monoesters as gentle as possible, and their separation should be carried out at temperatures below 100° C. This makes it desirable to use in the molecular still a very high vacuum, and I prefer to use pressures well below a millimeter of mercury and preferably of the order of 10 microns or less. Also, a very short-path molecular still should be used in order to effect a molecular distillation at minimum temperature and in the shortest time. In this still which we prefer there are two cylindrical surfaces very close to each other, one of which is maintained at a higher temperature and one at a very low temperature. A thin film of the esters to be distilled is passed down the surface of the warm cylinder and multiple passes may be used. It is not necessary that all of the distillation be completed in a single pass. By maintaining the desirable low temperatures and short times in the molecular still, it is possible to obtain the products of the present invention with less than one percent isomerism of the double bonds to form conjugated double bonds. This can be checked by the ultra-violet analysis. The gentle treatment also produces very little isomerism of cis compounds into trans compounds.

Another method of separating the low molecular-weight unsaturated esters and saturated esters from the high molecular polyunsaturated esters is to complex with urea. Complexes, which are in the nature of clathrate compounds, are produced in the presence of a polar solvent of which methanol is very suitable although the invention is not limited thereto. Other suitable solvents are ketones such as acetone, methyl ethyl ketone or methyl isobutyl ketone. Clathrate compounds, which are crystalline complexes, form preferentially with the saturated or lower molecular weight unsaturated esters. They are easily separated and a raffinate is produced which is relatively rich in the polyunsaturated higher esters of the compounds of the present invention. However, this is not a serious disadvantage since the excess urea can be easily recovered and even the urea which is consumed in forming the clathrate complexes can be regenerated easily by heating the complex to 60 to 125° C. in the presence of an alkanol or water. In general, rapid clathrate formation takes place with amounts of urea from 18 molar up. There is no upper limit except that dictated by economics, because unnecessary amounts of urea beyond that which gives a fast clathrate formation would simply add to the cost of the process.

The treatment with urea is desirably conducted at a temperature between 0° C. and 75° C. and preferably between 15° C. and 45° C. The period should be sufficient to complete clathrate formation which will usually be from one-half to three hours. The time, of course, will vary with the excess of urea and with other factors. The materials which can be used as raw material for the production of the products in the present invention are almost any mixture of glycerides or even fatty acids which have a large proportion of high molecular-weight unsaturated acids. For practical purposes the marine oils constitute the preferred source of material. In general, these products will have an iodine value in excess of 125 and preferably in excess of 150. Typical oils are fish oils such as herring, sardine, salmon, pilchard, cod, menhaden and whale oils.

As has been pointed out above, the transesterification or interesterification steps are not new. However, it is desirable to eliminate water and so anhydrous procedures are preferred, for example, with typical alkaline catalyst such as anhydrous alkali metal hydroxides, sodium methoxide, metallic sodium, alloys of sodium and potassium and strong quaternary ammonium bases such as trimethyl benzyl ammonium hydroxide. The amount of the catalyst used is in general similar to known procedures and from 0.1 percent to 2 percent by weight of the starting material will ordinarily be a very satisfactory range. The amount of catalyst is not critical, and larger and smaller amounts may be used.

The term glyceridic oil employed in the description and claims denotes any liquid or solid fats, and is intended to include both liquid and solid glycerides regardless of their physical state at room temperature.

While the present invention is not limited in its broader aspects to any particular starting material it is helpful to start with deodorized or partly deodorized natural oils. An improved method of deodorizing is included as a part of a preferred modification of the invention. Hitherto deodorization of natural oils, such as fish oils, has been effected by prolonged stripping with steam. I have found that these oils can be deodorized by stripping the oil with a small quantity of some material of reduced volatility. I have deodorized fish oil by distilling with 5% of a volatile hydrocarbon added to the oil. The same deodorizing effect can be accomplished by stripping the oil with even smaller quantities (2%) of simple esters. Most economically, I use the lower molecular weight esters separated from the highly unsaturated esters which comprise my product. However, the stripping agent may be a ketone, alcohol, or halide, or other inert material of low vapor pressure. An additional advantage to my method of deodorizing natural fats is that virtually all of the free acids that may be present are removed, and the temperature history of the fat is minimized. The latter effect is very important to the structural integrity of unsaturated fatty oils.

The following examples illustrating the invention are given. It should be understood, however, that these are given solely as examples and are intended neither to delineate the scope of the invention nor limit the ambit of the appended claims. In the examples which follow, and throughout the specification, the quantities of materials are expressed in terms of parts by weight, unless otherwise specified.

EXAMPLE 1

A sample of 1200 parts of cold pressed menhaden oil was mixed with 1200 parts of absolute methanol containing 4 parts of dissolved potassium hydroxide. The mixture was stirred and boiled under reflux for 1.5 hours. After cooling, the mixture comprised two layers: (1) a layer of methanol in methyl esters of menhaden oil acids, and (2) a layer of glycerol in methyl esters of menhaden oil acids. The top methanol-in-esters layer was washed with 500 parts of water containing 3 ml. of concentrated sulfuric acid to neutralize the alkali. The aqueous layer thus formed was then washed with 100 ml. of toluene to extract the methyl esters. The toluene layer, the washed methanol layer, and the main ester layer were combined and evaporated to constant weight at 1 mm. of mercury pressure at room temperature. This product was crude methyl esters of menhaden oil fatty acids weighing 1205 gm.

These crude methyl esters were distilled in a short-path, continuous, high vacuum molecular still of the accelerated film type, consisting of a vertical heated glass cylinder, the inside of which was the distillation surface. A stream of crude esters was fed to the top inside of the cylinder where it was propelled around and down by a wiper which insured a thin and mobile surface of the distilling mixture. The distillate was collected on a thin cold cylinder at the axis of the still. The distillation residue was collected at the bottom of the outer cylinder. The distillation was conducted at a pressure of 10 microns of mercury, the wall temperature of the still being set at 100° C. The crude methyl esters were fed at a rate sufficient to permit the desired fraction of esters to distill. The residue was recycled to the still.

Diagram 1 below illustrates the partition of the crude esters by repeated distillations of the fractions. After four distillations, 32% of the crude esters was isolated as a concentrate having an iodine value in excess of 300 (Fractions G and H).

DIAGRAM 1

*Partition of Methyl Fatty Esters*

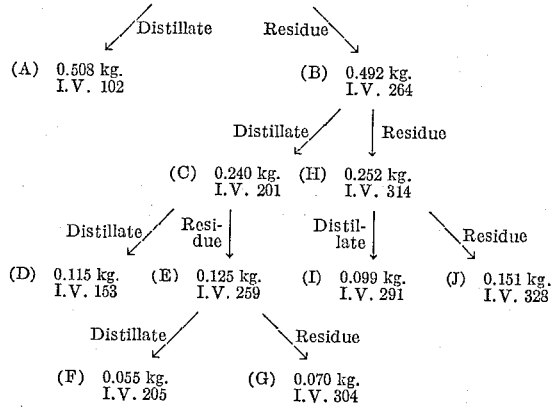

EXAMPLE 2

The molecular distillation of the crude mixed methyl esters of menhaden oil fatty acids produced in Example 1 above was repeated, employing only 3 distillations this time under the same conditions as in Example 1. The results are shown in Diagram 2 below, whereby 20% of the starting material was isolated as a distilled mixture with iodine value of 328 (Fraction E).

DIAGRAM 2

*Partition of Methyl Fatty Esters*

(Crude mixed methyl esters) 1.00 kg., I.V. (Iodine Value) 178

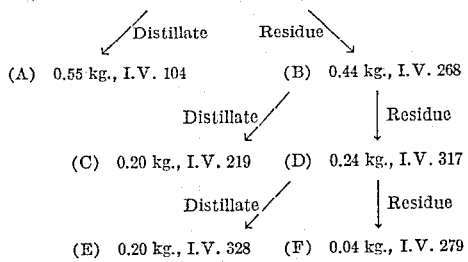

(A) 0.55 kg., I.V. 104    (B) 0.44 kg., I.V. 268

(C) 0.20 kg., I.V. 219    (D) 0.24 kg., I.V. 317

(E) 0.20 kg., I.V. 328    (F) 0.04 kg., I.V. 279

When "Fraction E" (I.V. 328) was fed to rats on a high cholesterol diet, the accumulation of cholesterol in the blood of the rats was prevented. When the fraction was analyzed by gas chromatography on a polyester column, the distribution of fatty acids in terms of weight percent of each fatty acid ester are reported in Table 1 below.

*Table 1*

ANALYSIS OF METHYL ESTER SAMPLE TESTED PHARMACOLOGICALLY

| | Percent |
|---|---|
| Docosahexaenoic ester | 29.6 |
| Docosapentaenoic ester | 9.5 |
| Hencosahexaenoic ester | 0.5 |
| Hencosapentaenoic ester | 3.3 |
| Eicosapentaenoic ester | 32.9 |
| Eicosatetraenoic ester | 2.5 |
| Eicosatrienoic ester | 4.0 |
| Nonadecatetraenoic ester | 0.3 |
| Nonadecadienoic ester | 0.2 |
| Octadecatetraenoic ester | 1.3 |
| Linolenic ester | 5.6 |
| Linoleic ester | 0.7 |
| Oleic ester | 6.7 |
| Stearic ester | 2.2 |
| Palmitoleic ester | 0.3 |
| Palmitic ester | 0.4 |
| Myristoleic ester | 0.2 |

EXAMPLE 3

A sample of pharmaceutical grade cod liver oil (643 parts) was treated with 714 parts of methanol and 5 parts of $NaOCH_3$ and the mixture was boiled under reflux for two hours. The product was washed with 0.5% $H_2SO_4$ and again with water and distilled at $6\mu$ pressure. The distillation was performed according to the outline in Diagram 3.

DIAGRAM 3

*Partition of Cod Liver Oil Esters*

Crude Cod Liver Oil Esters, 1 part I.V. 163

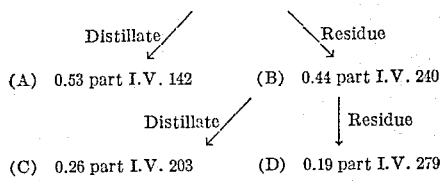

(A) 0.53 part I.V. 142    (B) 0.44 part I.V. 240

(C) 0.26 part I.V. 203    (D) 0.19 part I.V. 279

EXAMPLE 4

Ethyl esters of cod liver oil fatty acids were produced by transesterification with absolute ethanol and potassium hydroxide as follows:

About 0.6 gm. of potassium hydroxide was dissolved in 125 gm. of absolute ethanol and heated to boiling under reflux. To the solution was added 122 gm. of cod liver oil and the resulting mixture refluxed for about 1¼ hours. After cooling to room temperature the mixture was washed with 100 ml. of water. An emulsion formed, which was broken upon the addition of 100 ml. of 1% sulfuric acid. The aqueous layer was washed with two 50 ml. portions of methyl isobutyl ketone and discarded. The methyl isobutyl ketone wash liquor and the oil layer, which contained the ethyl esters of cod liver oil fatty acids, were combined and vacuum evaporated to remove the solvents. The residue was not subjected to molecular distillation as in Example 3. The residue gave the following analysis:

| Fatty Acid Distribution (Weight Percent) | | | | | Iodine No. |
|---|---|---|---|---|---|
| $C_{14}$ | $C_{16}$ | $C_{18}$ | $C_{20}$ | $C_{22}$ | |
| 4.5 | 22.4 | 29.8 | 23.6 | 19.6 | 156 |

EXAMPLE 5

Two gallons of methyl esters of $C_{14}$–$C_{18}$ acids were added to 100 gallons of cold pressed menhaden oil and the mixture stripped in a molecular still. By this means, all of the odor bodies and free acids were removed in the distillate. By this means, 772 lbs. of clean, acid-free, sweet smelling oil was obtained as residue and 25 lbs. of acids, odor bodies and simple esters were collected as distillate.

The residue was converted to methyl esters by refluxing with an equal weight of methanol in which there had been dissolved 1.75 lb. of metallic sodium. After being washed, these esters were distilled twice, as in Example 2, and 280 lbs. of residue were collected with iodine value of 306.

These esters were transesterified with ethyl alcohol, using 1.5 lb. of ethanol and 0.01 lb. of $NaOC_2H_5$ as catalyst per pound of fatty ester. Methanol was stripped off through a 10-plate fractionating column. The residue comprised an ethyl alcohol solution containing fatty esters which were 96% ethyl esters. These were stirred with a 16% solution of urea in ethanol and cooled. The slurry which formed contained solid urea complex of the saturated esters remaining after the distillation process. The complex was filtered and the filtrate was washed and distilled. By this means a cut of 172 lbs. of ethyl esters was obtained having the analysis shown in Table 2.

*Table 2*

ETHYL FATTY ESTERS—ANALYSES

| | | A | B |
|---|---|---|---|
| unsaturation (iodine no.) | meq./gm. | 11.89 (302) | 11.66 (296) |
| peroxide | mmoles/kg. | 1.0 | 2.9 |
| conjugation: | | | |
| IV | percent | 0.16 | 0.23 |
| III | do | 0.17 | 0.42 |
| II | do | 1.49 | 2.76 |
| acid moiety: | | | |
| $C_{22}$ | do | 48.3 | 31.1 |
| $C_{20}$ | do | 33.7 | 43.7 |
| $C_{18}$ | do | 16.0 | 21.8 |
| $C_{16}$ | do | 2.0 | 3.2 |
| $C_{14}$ | do | | 0.2 |

| | Double Bonds Per Molecule | Percent | Percent |
|---|---|---|---|
| Carbons in Acid Moiety: | | | |
| $C_{22}$ | VI | 40.4 | 42.0 |
| $C_{22}$ | V | 3.1 | 0.5 |
| $C_{22}$ | IV | 2.1 | 0.9 |
| $C_{22}$ | III | | 0.3 |
| $C_{20}$ | V | 26.4 | 31.1 |
| $C_{20}$ | IV | 1.0 | 0.9 |
| $C_{20}$ | II | | 0.4 |
| $C_{20}$ | I | 1.7 | 3.2 |
| $C_{20}$ | 0 | 4.2 | 2.8 |
| $C_{18}$ | IV | 3.6 | 0.2 |
| $C_{18}$ | II | 2.5 | 1.0 |
| $C_{18}$ | I | 9.3 | 10.3 |
| $C_{18}$ | 0 | 2.5 | 3.5 |
| $C_{17}$ | 0 | | 0.2 |
| $C_{16}$ | 1 | 1.2 | 0.6 |
| $C_{16}$ | 0 | 1.8 | 1.9 |
| $C_{14}$ | 0 | .2 | .1 |

The product (A) obtained in Example 5 has been used in animal and human clinical studies with remarkable success in the reduction of blood cholesterol levels. While the preferred dosage is of the order of 5–10 g. per day per human it has been fed as high as 90 grams per day without objectionable reaction in the patient.

Product A was fed to patients having high cholesterol blood-levels and after 30 days these patients showed cholesterol lowerings as great as 25% on dosages of 4–16 g. per day.

This product has been tested in the diet of rats for prolonged periods to explore possible toxicity, and none has been observed. No dermatitis was observed on the faces of our rats, nor in any of the organs of the body were there any abnormalities.

The product (B) in the diet of rats challenged with dietary cholesterol was superior to corn oil as an inhibitor even at only ⅓ the level used with corn oil. It maintained this superiority even when the other ⅔ of fat in the diet was tallow.

EXAMPLE 6

A sample of light pressed menhaden oil was diluted with 5% of its weight of Nujol distillate which had been distilled at 160–180° at 30µ pressure. The mixture was passed once through the molecular still at 200° at 20µ pressure. The distillate contained all of the Nujol and most of the acid and odor components of the fish oil. The residue contained 96% of the mehaden oil charged. By this means the free acid content of the fat has been reduced from 0.08 meq./g. to 0.01 meq./g.

The examples are typical illustrations of the production of products coming within the present invention and of the processes by which they may be produced. It should be understood, however, that the product is in no sense limited to those produced by the processes described in the examples. In another and more specific aspect, however, the invention does include these improved processes.

This application is in part a continuation of my copending application, Serial No. 775,731, filed November 24, 1958, now abandoned.

I claim:

1. A process for producing a product comprising at least 60 percent of mono esters of polyunsaturated fatty acids having at least 20 carbon atoms which comprises subjecting a mixture consisting essentially of mono esters selected from the group consisting of lower alkyl esters and monoglycerides of substantially unconjugated fatty acids from natural glyceride oils to distillation in a short-path molecular still under a vacuum at least as high as one millimeter of mercury at a temperature below 100° C. to produce the said fraction of mono esters of polyunsaturated acids of at least 20 carbon atoms.

2. A process according to claim 1 in which the esters are methyl esters.

3. A process according to claim 1 in which the esters are ethyl esters.

4. A process according to claim 1 in which the mono esters are mono esters of a marine glyceride oil.

5. A process according to claim 1 in which the product is further refined by treating with an excess of urea to form crystalline clathrates of a more saturated and lower molecular fatty acids.

6. A process according to claim 1 in which the glyceride oil, before transformation into the corresponding mono esters, is deodorized by distillation with a small amount of a volatile inert organic liquid.

References Cited in the file of this patent

UNITED STATES PATENTS

| | | |
|---|---|---|
| 2,126,466 | Hickman | Aug. 9, 1938 |
| 2,136,774 | Hickman | Nov. 15, 1938 |
| 2,290,609 | Goss et al. | July 21, 1942 |
| 2,549,372 | Fetterly | Apr. 17, 1951 |
| 2,596,344 | Newey et al. | May 13, 1952 |
| 2,653,123 | Kirsch et al. | Sept. 22, 1953 |

OTHER REFERENCES

Rose: "The Condensed Chemical Dictionary," 5th ed., Reinhold Pub. Corp., New York, 1956.